UNITED STATES PATENT OFFICE.

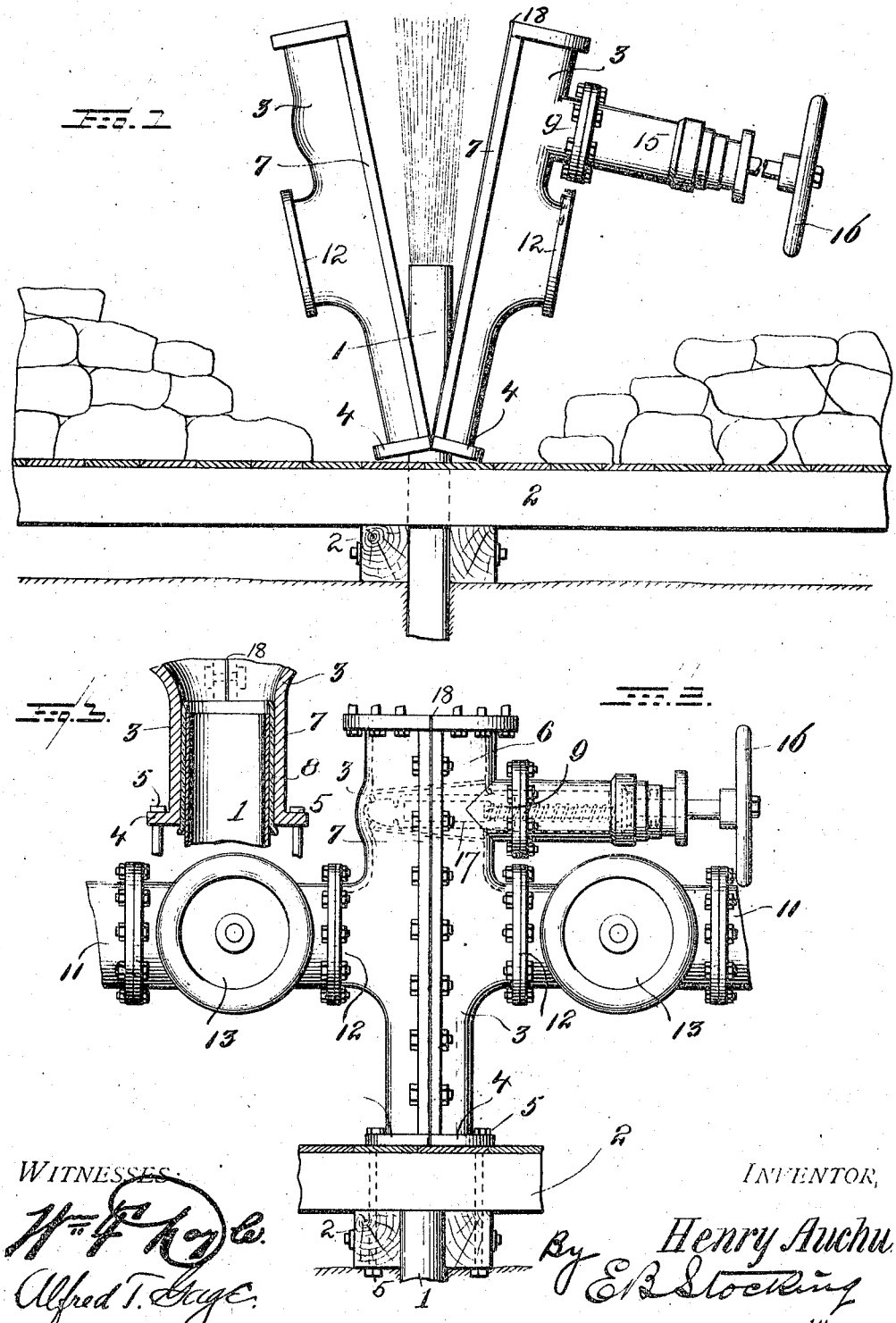

HENRY AUCHU, OF EMPORIUM, PENNSYLVANIA.

CASING-HEAD.

No. 858,321.  Specification of Letters Patent.  Patented June 25, 1907.

Application filed February 27, 1907. Serial No. 359,599.

*To all whom it may concern:*

Be it known that I, HENRY AUCHU, a citizen of the United States, residing at Emporium, in the county of Cameron, State of Pennsylvania, have invented certain new and useful Improvements in Casing-Heads, of which the following is a specification, reference being had therein to the accompanying drawing.

This invention relates to certain new and useful improvements in casing heads for wells.

The invention has for an object to provide an improved construction and arrangement of casing head for oil or gas wells comprising two sections to be secured to the upper end of the well tubing or casing, said sections being secured together by any suitable means with a packing between them to prevent the escape of oil or gas, the upper portion of the casing head being provided with a gate or valve whereby the flow of liquid or gas from the well may be cut off or controlled.

Other and further objects and advantages of the invention will be hereinafter set forth and the novel features thereof defined by the appended claims.

In the drawing:—Figure 1 is an elevation showing the manner of applying the same to a well Fig. 2 is a similar view showing the invention in position upon a well, and Fig. 3 is a detail section of the lower part of the casing head.

Referring to the drawing, the numeral 1 designates the upper end of a well casing or tubing which is passed through a heavy anchor or platform 2 weighted in any suitable manner, for instance by stones, as shown in Fig. 1. The casing head, which comprises the two segmental sections 3 is adapted to be placed around the well casing or tubing 1, each section being secured to the anchor 2 by any desired means, for instance, bolts 5 passing through the flanges 4 on the lower ends of the sections and also through the anchor, as shown in Fig. 2. Each of the segmental sections is provided at its abutting edge with the securing flange 7 through which any desired means, such as the bolts 6 are passed for joining the sections together and in contact with the packing 8 surrounding the well tube in order to form a perfectly tight joint between the parts. Intermediate of the ends of each section a tee 12 is provided to which are attached the conducting pipes 11, said pipes being provided with controlling valves 13 to regulate the flow therethrough. One of the sections is provided above the coupling tee with a valve connection 9 to which the valve casing 15 is adapted to be applied. The valve 17 is provided with an operating wheel 16, and the opposite section is provided with a coöperating valve seat, as shown by dotted lines in Fig. 2.

In the application of the invention the sections are first placed at opposite sides of the upper end of the well tubing, as shown in Fig. 1, and when brought together with an interposed packing 18, they are securely bolted and the end flanges also secured to the anchor to retain the head against longitudinal movement relative to the well tube or casing. The distributing pipes are then connected to the coupling tees in the usual manner and the valve carried by the head may now be closed to prevent the escape from the well and cause the same to flow through the conducting pipes. It will be obvious that a partial closing of this valve will determine the pressure in these pipes and the flow may also be regulated by the valves therein to cut it off on either or both sides in case of fire. From the above it will be seen that the invention is especially adapted for use in connection with high pressure wells or those difficult to control. The sections of the head being applied from opposite sides of the discharge of the well do not encounter the pressure therefrom and, in fact, are free from such pressure until secured in position and the valve therein closed. This casing head renders the employment of a threaded connection with the well casing or tubing unnecessary and avoids bringing the head downward over the tubing and against the pressure therefrom which is most dangerous and costly. The head sections are applied to the well casing below the point where the escaping gas or oil renders it difficult or impossible to operate and in this manner the head can be applied and clamped to the casing by the packed connection without danger of being blown away by the pressure or otherwise damaged. The invention therefore presents a simple and economically constructed casing head by means of which the most unmanageable wells may be subjected and the flow of liquid therefrom easily and conveniently controlled.

Having described my invention and set forth its merits, what I claim and desire to secure by Letters Patent is:—

1. A casing head formed of segmental sections one of which is provided with a cut off valve and the opposite section with a coöperating seat.

2. A casing head formed of independent sections each provided with abutting flanges, a valve carried by one of said sections, a seat upon an opposite section to coöperate with said valve, and means for securing said flanges in contact.

3. A casing head formed in independent sections each provided with abutting flanges, a valve carried by one of said sections, a seat upon an opposite section to coöperate with said valve, means for securing said flanges in contact, a packing sheet disposed within said sections, an anchor, and means connecting each of said sections to said anchor to resist longitudinal movement thereof.

4. A casing head formed in segmental sections one of which is provided with a lateral connection, means for securing said sections against longitudinal movement relative to a well casing, and a valve carried by said lateral connection on one of said sections to control the flow from said casing.

5. A casing head formed in segmental sections, means for securing said sections in contact with each other and with a well casing, a valve carried by one of said sections to control the flow from said casing, an anchor for said head, and means for securing said sections to the anchor.

6. A casing head formed in segmental sections each provided with flanges at their abutting edges, means for securing said flanges together, an anchor, means for securing said sections to said anchor, and a cut off valve carried by one of said sections.

7. A casing head formed in segmental sections each provided with flanges upon their abutting edges, means for securing said flanges in contact with each other, a flange upon the lower end of each section, an anchor, and means for securing said end flanges to the anchor.

8. A casing head formed in sections adapted to embrace a well casing, packing interposed between said sections and casing, means for securing said sections in engagement with the well casing and with each other, means for securing each section to an anchor, a cut off valve in said casing head, and conducting pipes communicating with each section.

9. A casing head formed in sections to embrace the casing of a well, bolts for securing said sections together and in contact with said well casing, means for attaching each section to an anchor, and a cut off valve in said sections.

10. A casing head formed in sections, flanges formed on said sections, securing means passing through said flanges to secure said sections together and in engagement with the well casing, flanges formed on the lower ends of said sections, and securing means passing therethrough to secure said sections to an anchor.

In testimony whereof, I affix my signature in presence of two witnesses.

HENRY AUCHU.

Witnesses:
CHARLES T. LOGAN,
GEO. P. JONES.